United States Patent [19]
Even et al.

[11] Patent Number: 5,942,826
[45] Date of Patent: Aug. 24, 1999

[54] EDDY CURRENT APPARATUS

[75] Inventors: Denis Even, Vaureal; Stefan Bouissou, Paris, both of France

[73] Assignee: Labavia SGE, Montigny-le-Bretonneux, France

[21] Appl. No.: 08/993,842

[22] Filed: Dec. 18, 1997

[30] Foreign Application Priority Data

Dec. 20, 1996 [FR] France .................................. 96 15753

[51] Int. Cl.⁶ ........................... H02K 49/00; H02K 49/04
[52] U.S. Cl. ............................................. 310/105; 310/93
[58] Field of Search ............................. 310/93, 103, 105, 310/106; 183/158, 159, 161, 164, 264 R, 267; 192/84.1, 84.2, 113.23

[56] References Cited

U.S. PATENT DOCUMENTS

| | | | |
|---|---|---|---|
| 1,031,081 | 7/1912 | Miram et al. | 192/84.2 |
| 2,073,926 | 3/1937 | Fraser | 310/93 |
| 2,240,652 | 5/1941 | Jenkins | 310/193 |
| 2,640,941 | 6/1953 | Winther | 310/93 |
| 2,693,263 | 11/1954 | Becking | 192/84.2 |
| 2,833,945 | 5/1958 | Bessiere | 310/93 |
| 4,668,886 | 5/1987 | Marandet et al. | 310/105 |

FOREIGN PATENT DOCUMENTS

| | | | |
|---|---|---|---|
| 452820 | 5/1913 | France . | |
| 1005416 | 4/1952 | France . | |
| 444279 | 2/1968 | Switzerland | 310/105 |
| 2168440 | 6/1986 | United Kingdom . | |

*Primary Examiner*—Clayton LaBalle
*Attorney, Agent, or Firm*—Christensen O'Connor Johnson & Kindness PLLC

[57] ABSTRACT

The rotor or the stator of the apparatus has inductor coils whose respective axes are parallel to the axis of rotation and distributed at regular intervals along a circle centred on the axis of rotation. Each coil is traversed by a cylindrical pole core, one end of which is provided with a pole shoe of larger cross-section. An armature disc travels past these pole shoes with interposition of a gap. In relation to the direction of travel of the armature disc, each pole shoe offers an area which is larger in front than to the rear of the radial plane passing through the axis of rotation and through the axis of the corresponding coil. Each pole shoe has a rear edge of convex general shape in a plane parallel to the armature disc.

6 Claims, 3 Drawing Sheets

EDDY CURRENT APPARATUS

BACKGROUND OF THE INVENTION

The present invention relates to an eddy current apparatus comprising a stator assembly, and a rotor assembly revolving with respect to the stator assembly about an axis of rotation, one of the two assemblies including inductor coils whose respective axes are parallel to the axis of rotation and distributed at regular intervals along a circle centred on the axis of rotation, each coil being traversed by a cylindrical pole core, one end of which is provided with a pole shoe of larger cross-section, and the other of the two assemblies including at least one armature disc situated facing the pole shoes with interposition of a gap, in which, in relation to the direction of travel of the armature disc past the pole shoes, each pole shoe offers to the armature disc an area which is larger in front than to the rear of the radial plane passing through the axis of rotation and through the axis of the corresponding coil.

It relates, in particular, but not exclusively to eddy current retarders in which the inductor coils form part of the stator assembly, and the armature disc forms part of the rotor assembly.

The pole shoes fulfill several functions:

they leave a certain distance between the coils and the armature so as to limit the magnetic forces of axial attraction which are exerted on the armature;

they ensure good distribution of the magnetic flux in the armature and hence efficient generation of eddy currents;

they also have a mechanical role of holding in place and protecting the coils and/or the pole cores.

The benefit in providing for the pole shoes to offer to the armature disc a larger area in front than to the rear of the radial plane passing through the polar axis has been demonstrated in French Patent No. 2,574,228 or U.S. Pat. No. 4,668,886. This makes it possible to attain higher braking torques by virtue of lesser magnetic saturation on the rear side of the shoes as compared with the conventional configuration in which the shoes are placed symmetrically with respect to the aforesaid radial plane.

An object of the present invention is to further increase the torques which the apparatus is capable of generating by producing eddy currents in the armature.

SUMMARY OF THE INVENTION

The invention thus proposes, in an apparatus of the type indicated in the introduction, to impart a convex general shape, in a plane parallel to the armature disc, to the rear edges of the pole shoes.

Ideally, this rear edge would have the shape of a circular sector extending the cylindrical shape of the subjacent pole core. This would minimize the saturation in the magnetic material of the shoe, thus ensuring better transmission of the magnetic flux to the armature.

However in practice, the mechanical functions of the pole shoes, and the constraints on their mounting, generally involve allowing the shoe to overhang to the rear with respect to the cylindrical shape of the core. The space between the core and the coil can thereby be properly blanked off by the shoe. The overhang may allow more accurate positioning and firmer holding of the shoe so that a gap with a small and as constant as possible a thickness is better guaranteed. Moreover, when the shoe serves to lock the coil and/or the core in place, this locking is better ensured.

The inventors have observed a noticeable improvement in the torque developed when this overhang is limited in such a way that the distance between each point of the rear edge of a pole shoe and the axis of the corresponding coil remains less than 70% of the diameter of the pole core, each pole shoe offering to the armature disc an overall area greater by at least 60% than the area of the cross-section of the pole core.

In a preferred embodiment, the rear edge of each pole shoe includes, in a plane parallel to the armature disc, a portion in the shape of an arc of a circle centred on the axis of the corresponding coil, of slightly greater radius than the radius of the cylindrical pole core. Typically, this radius of the circular arc portion of the rear edge of the shoe does not exceed 55% of the diameter of the pole core, and this circular arc portion represents an angular sector of at least 60°.

Alternatively, the rear edge of the pole shoe may have, in a plane parallel to the armature disc, a convex polygonal shape with rounded vertices.

DESCRIPTION OF PREFERRED EMBODIMENTS

Figure 1:
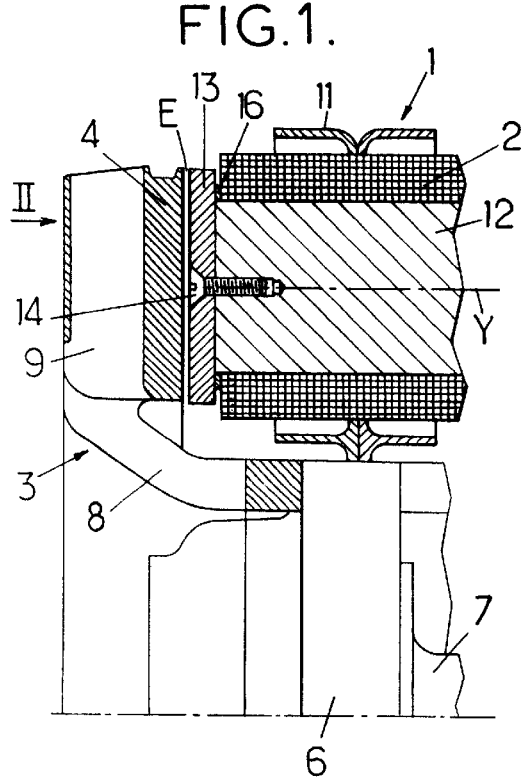
FIG. 1 is a diagrammatic half-view in axial section, through the plane P indicated in FIG. 2, of an eddy current retarder according to the invention.

The invention is described below in its preferred but non-limiting application to eddy current retarders whose stator 1 carries the inductor coils 2 and whose rotor 3 includes the armature disc 4.

The rotor 3 is fixed by way of an insert piece 6 to a transmission shaft 7 of the vehicle equipped with the retarder. The rotor 3 includes elbowed arms 8 which link the armature disc 4 to the piece 6. In a conventional manner, ventilation fins 9 are provided on the back of the disc 4 so as to create air passages facilitating evacuation of the heat dissipated by the Joule effect in the armature. In general, the rotor 3 will include an armature disc 4 on each side of the stator 1.

The stator 1 includes a support 11 fixed by appropriate means to the chassis of the vehicle, or else to the casing of the gearbox of the vehicle. This support 11 includes a central opening for allowing through the shaft 7 and the rotor 3. It carries the inductor coils 2, of which there are eight in the case considered. These eight coils 2 have their axes Y parallel to the axis of rotation X of the shaft 7 and of the rotor 3. These axes Y are distributed at regular intervals of 45° over a circle C centred on the axis of rotation X. The directions of winding of the conductor wire alternate from one coil to the next along the circle C, in such a way as to cause the polarities of the inductors to alternate.

Each coil 2 is traversed by a cylindrical pole core 12 with axis Y. Opposite disc 4, this pole core 12 has a forward end provided with a pole shoe 13 of larger cross-section, by at least 60%, than the circular cross-section of the core 12. The shoe 13 is fixed to the pole core 12 by tightening a screw 14 situated on the Y axis of the coil.

Figure 2:
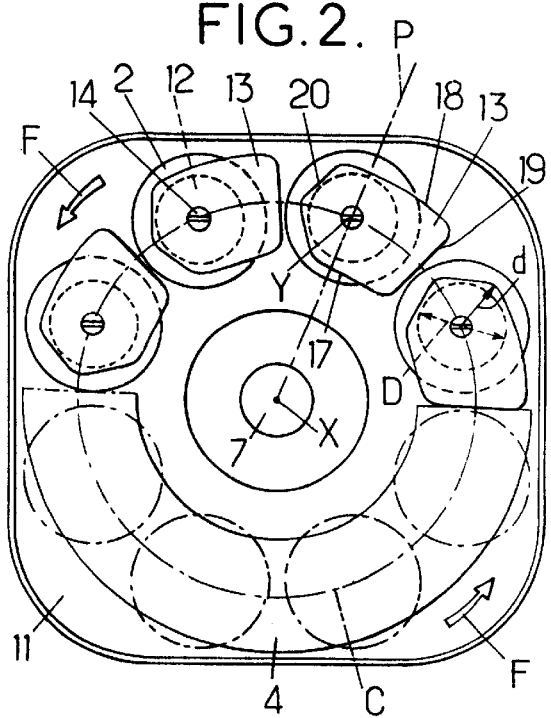
FIG. 2 is an axial view, along the direction II indicated in FIG. 1 of the stator of this retarder, the armature disc being represented in the lower half of the figure.

In the example represented in FIGS. 1 and 2, the pole shoe 13 serves to immobilize the coil 2 with respect to the pole core 12, a washer 16 being placed around the forward end of the core 12, between the shoe 13 and the forward end of the coil 2.

A gap E of small thickness is traversed by the magnetic flux between the pole shoe 13 and the armature disc 4 which travels past it, in the direction indicated by the arrows F in FIG. 2.

It may be seen that, in relation to the direction of travel F, each shoe 13 offers to the armature disc 4 a larger area in front than to the rear of the radial plane P passing through the axis of rotation X and through the axis Y of the corresponding coil 2. In other words, the inside 17 and outside 18 edges of the shoe 13 being approximately perpendicular to the plane P, the front edge 19 of the shoe 13 is further from the plane P than its rear edge 20. Since the phenomenon of armature reaction tends to concentrate towards the rear of the shoe the magnetic flux lines, this asymmetry of the pole shoe with respect to the plane P limits the saturation, and hence the inefficient consumption of ampere-turns, in the shoe. This causes an increase in the braking torque obtained, as compared with symmetric positioning of the shoe 13.

The inventors have observed that this advantage could be further strengthened by imparting to the rear edge 20 of the shoe a convex general shape in a plane parallel to the armature disc (the plane of FIG. 2), in particular when the distance d between this rear edge and the pole axis Y is everywhere less than 70% of the diameter D of the pole core 12.

In the example represented in FIG. 2, the rear edge 20 of each shoe 13 has a convex polygonal shape with rounded vertices, on two sides, the vertex between these two sides lying approximately on the circle C passing through the pole axes Y. As compared with a shoe of trapezoidal shape, such as that described in U.S. Pat. No. 4,668,886, this amounts to removing material at the rear of the shoe, material where the magnetic induction is relatively high, and where there is therefore a risk of magnetic saturation occurring.

Figure 3:
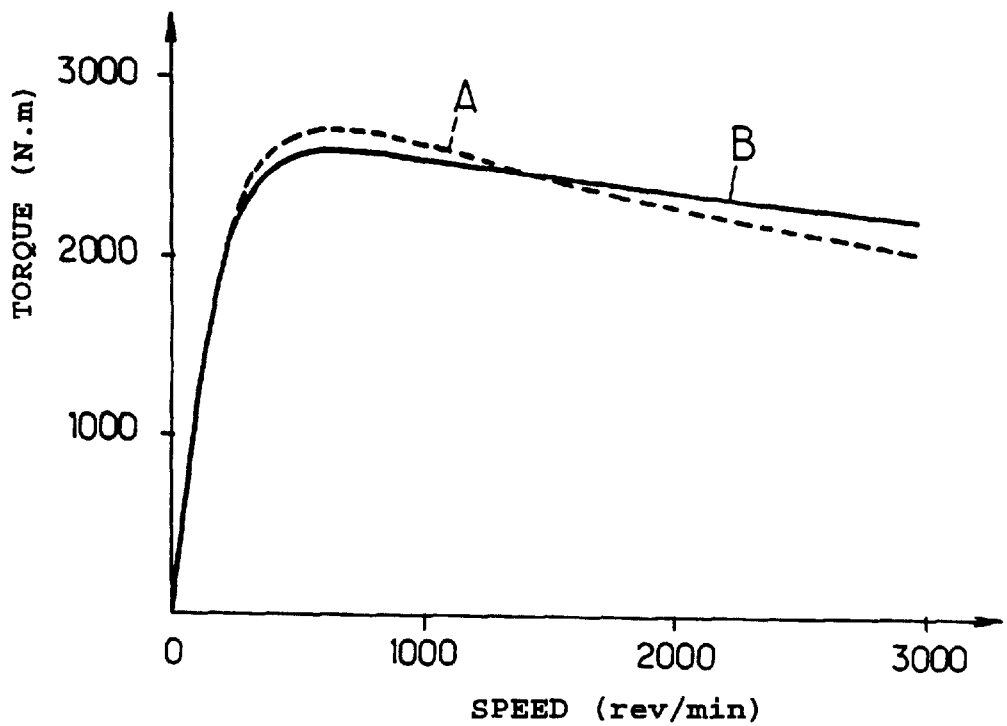
FIGS. 3 and 4 are graphs showing the improvement in the torque made possible by the arrangements of the invention as a function of the speed of the rotor and of the ampere-turns in the inductor coils.
Figure 4:
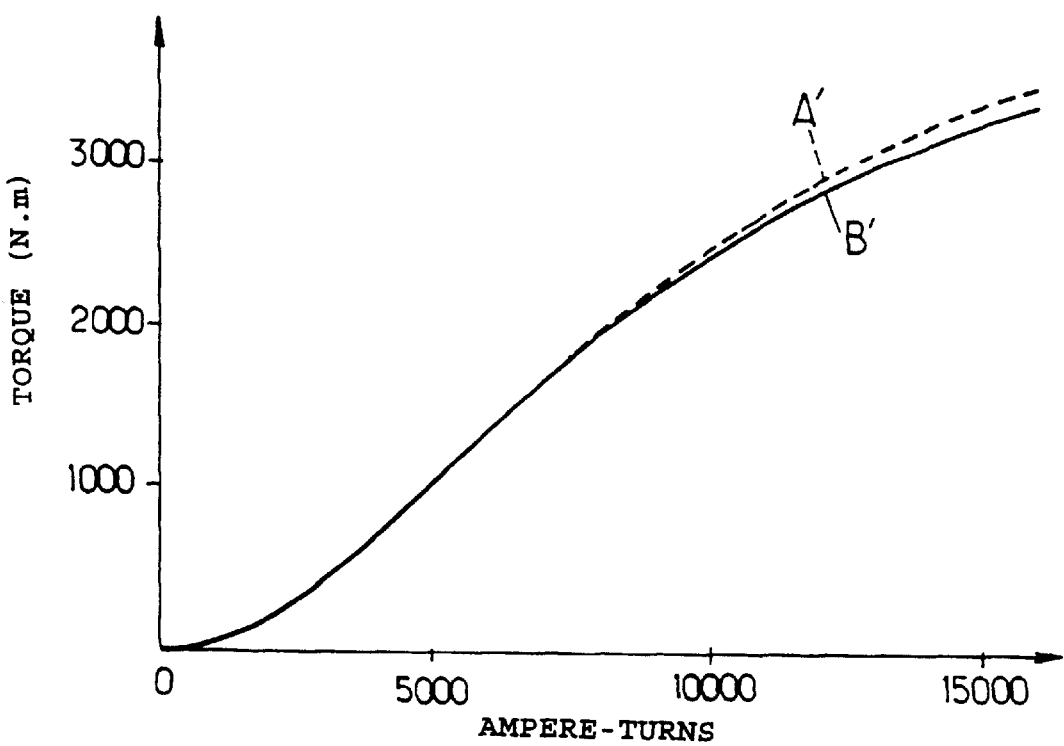

FIGS. 3 and 4 thus illustrate improvements obtained in the braking torque with a retarder such as that of FIG. 2. FIG. 3 shows the braking torque as a function of the speed of rotation of the rotor 3 for around 11,000 ampere-turns in the inductor coils 2, and FIG. 4 shows the braking torque as a function of ampere-turns for a speed of rotation of the order of 670 rpm. Curves A and A' correspond to a pole shoe whose rear edge has a shape such as that represented in FIG. 2, while curves B and B' correspond to a pole shoe whose rear edge is straight according to the prior art. We note an increase in the torque of the order of 10% for speeds below 1000 rpm and for ampere-turns above 10,000. These speed and ampere-turn brackets correspond to the normal operating ranges of the retarder.

A reduction in the braking torque for speeds above around 1500 rpm may be noted in FIG. 3. This reduction is explained by the decrease in the total area of the shoes. This drawback is not very troublesome since the retarder usually operates at lower speeds. It may moreover be alleviated by adapting the shape of the front edge of the pole shoe, for example in the manner illustrated by FIG. 5.

Figure 5:
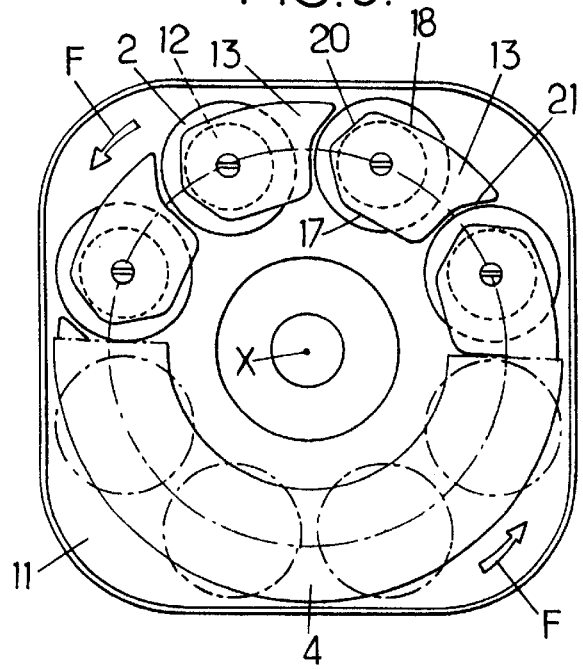
FIG. 5 is a view similar to FIG. 2 showing a possible variant in respect of the shape of the pole shoes.

In the example of FIG. 5, the front edge 21 of each pole shoe 13 has a concave general shape complementary to the convex shape of the rear edge 20. This makes it possible on the one hand to compensate for the reduction in the surface area of the shoe due to the truncating of its rear edge, and on the other hand to leave an interval, or "window", of substantially constant width between two adjacent pole shoes.

Figure 6:
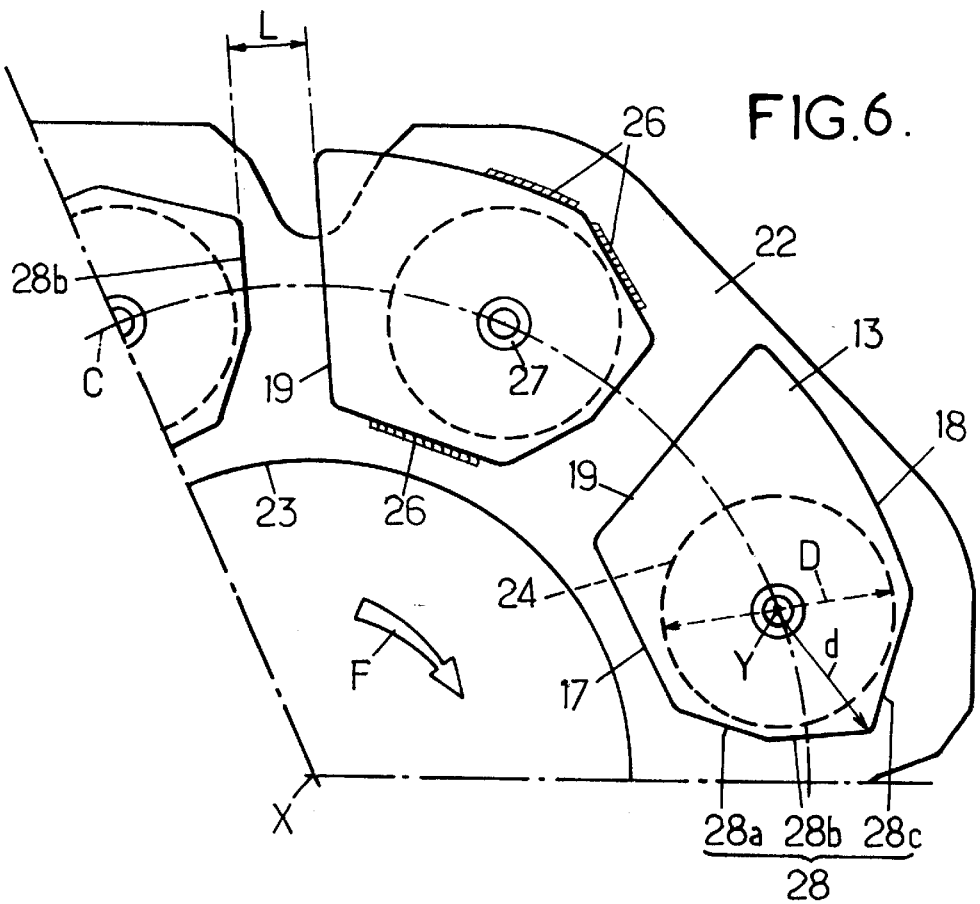
FIGS. 6 and 7 are partial axial views of plates carrying pole shoes usable in an apparatus according to the invention.
Figure 7:
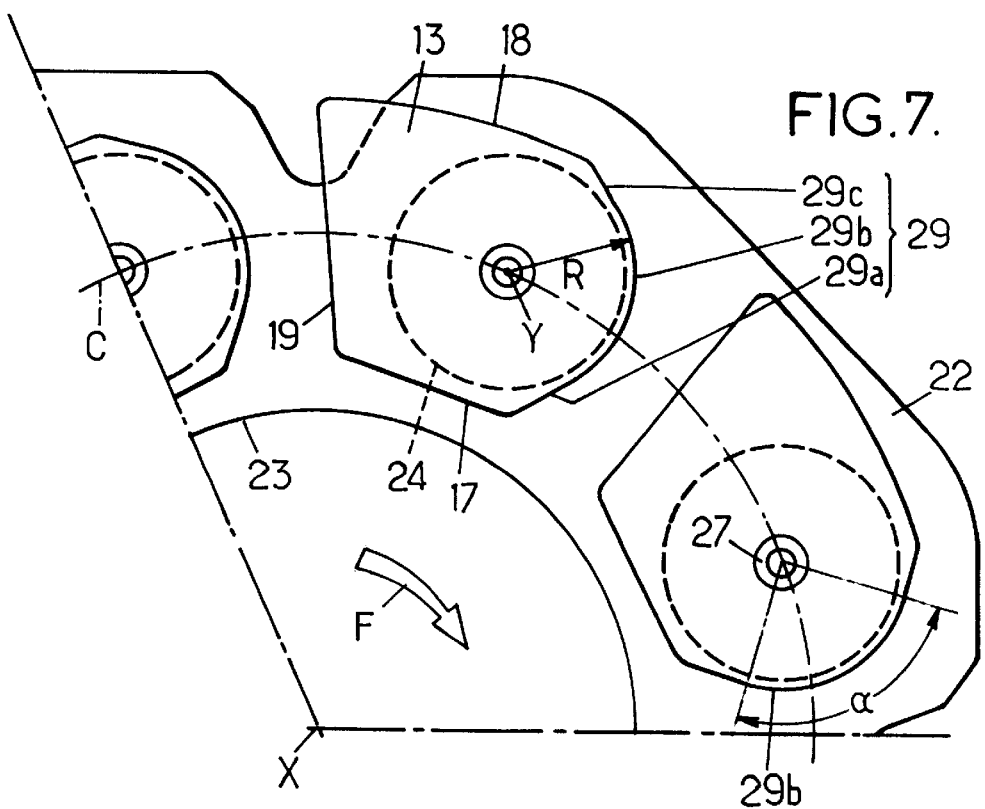

Other embodiments of the present invention are illustrated by FIGS. 6 and 7, in which it will be noted that the direction F of travel of the armature is the reverse of that represented in FIGS. 2 and 5. In these embodiments, the pole shoes 13 are carried by a support plate 22 made of a magnetic material forming part of the stator assembly. The plate 22 is of annular general shape, with a central orifice 23 for allowing through the rotor 3. The plate 22 is provided with eight circular orifices 24 of diameter just greater than that of the pole cores 12. The pole shoes 13 are welded to the plate 22 in such a way as to cover over the eight orifices 24. The welding is for example carried out by depositing by means of an appropriate robot three weld beads 26 in the angle between the plate 22 and the narrow face of the shoe 13 (cf. FIG. 6). After welding the shoes 13, the plate 22 is offered up to the stator provided with the coils 2 and their pole cores 12 in such a way as to engage the forward ends of the cores 12 in the orifices 24 of the plate 22. Screws similar to the screws 14 of FIG. 1 may then be screwed, through holes 27 provided in the shoes 13, into the complementary tappings provided in the pole cores 12 so as to immobilize the assembly.

In the example of FIG. 6, the rear edge 28 of each shoe 13 has a convex polygonal shape with rounded vertices on three sides 28a, 28b, 28c between the inside edge 17 and the outside edge 18 of the shoe. These three sides are almost tangential to the orifice 24 of the plate 22 covered over by the shoe 13, a small interval being left so as to guarantee that the shoe blanks off the orifice 24 in a reliable manner. The edges 28 of polygonal shape make it possible to deposit straight weld beads 26, this being more reliable with most existing welding robots.

The central portion 28b of the polygonal shape of the rear edge 28 is parallel to the straight front edge 19 of the shoe 13 which follows it in the direction F of travel of the armature 4 past the shoes. This arrangement makes it possible to obtain a constant width of window L over a part of the radial width of the shoes.

In the embodiment of FIG. 7, the rear edge 29 of each shoe 13 exhibits in succession, from the inside edge 17 to the outside edge 18, a first straight portion 29a, a circular arc portion 29b and a second straight portion 29c, the straight portions 29a and 29c being tangential to the central circular arc portion 29b. This circular arc portion 29b is centred on the pole axis Y, and its radius R is slightly greater (between 100% and 110%) than the radius of the cylindrical pole core 12 and than that of the orifice 24 of the plate 22. This circular arc extends over an angular sector $\alpha$ of at least 60° ($\alpha \approx 90°$ in the example represented).

We claim:

1. Eddy current apparatus comprising a stator assembly, and a rotor assembly revolving with respect to the stator assembly about an axis of rotation, one of the two assemblies including inductor coils having respective axes parallel to the axis of rotation and distributed at regular intervals along a circle centred on the axis of rotation, each coil having a cylindrical pole core extending therethrough, each pole core having an end provided with a widened pole shoe, and the other one of the two assemblies including at least one armature disc situated facing the pole shoes with interposition of a gap, wherein, in relation to a direction of travel of the armature disc past the pole shoes, each pole shoe offers to the armature disc an area which is larger in front than to the rear of a radial plane passing through the axis of rotation and through the axis of the corresponding coil, and wherein, in relation to the direction of travel of the armature disc past the pole shoes, each pole shoe has a rear edge of convex general shape in a plane parallel to the armature disc.

2. Apparatus according to claim 1, wherein each point of the rear edge of each pole shoe is separated from the axis of the corresponding coil by a distance smaller than 70% of a diameter of the pole core, and wherein each pole shoe offers to the armature disc an area greater by at least 60% than the area of a cross-section of the pole core.

3. Apparatus according to claim 1, wherein the pole cores are cylindrical, and wherein the rear edge of each pole shoe includes, in a plane parallel to the armature disc, a portion in the shape of an arc of a circle centred on the axis of the corresponding coil, said arc of a circle having a radius slightly greater than a radius of the cylindrical pole core.

4. Apparatus according to claim 1, wherein the rear edge of each pole shoe has, in a plane parallel to the armature disc, a convex polygonal shape with rounded vertices.

5. Apparatus according to claim 4, wherein the polygonal shape of the rear edge of each pole shoe has a central portion substantially parallel to a straight front edge of the following pole shoe in relation to the direction of travel of the armature disc past the pole shoes.

6. Apparatus according to claim 1, wherein each pole shoe has a front edge of concave general shape complementary to the convex shape of the rear edge, so that an interval of substantially constant width is between two adjacent pole shoes.

* * * * *